(12) United States Patent
Mital

(10) Patent No.: US 8,904,760 B2
(45) Date of Patent: Dec. 9, 2014

(54) EXHAUST GAS TREATMENT SYSTEM INCLUDING AN HC-SCR AND TWO-WAY CATALYST AND METHOD OF USING THE SAME

(75) Inventor: Rahul Mital, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 649 days.

(21) Appl. No.: 12/486,017

(22) Filed: Jun. 17, 2009

(65) Prior Publication Data

US 2010/0319324 A1 Dec. 23, 2010

(51) Int. Cl.
- *F01N 3/00* (2006.01)
- *F01N 3/021* (2006.01)
- *F01N 3/20* (2006.01)

(52) U.S. Cl.
CPC ........... *F01N 3/2066* (2013.01); *F01N 2560/06* (2013.01); *F01N 3/021* (2013.01); *F01N 2570/10* (2013.01); *F01N 3/2073* (2013.01); *F01N 2560/026* (2013.01); *F01N 2610/03* (2013.01); *F01N 2250/04* (2013.01); *Y02T 10/24* (2013.01); *Y02C 20/10* (2013.01); *F01N 2610/02* (2013.01); *F01N 2570/14* (2013.01)
USPC .................... 60/285; 60/274; 60/286; 60/301

(58) Field of Classification Search
USPC ............................. 60/274, 284–287, 295–301
See application file for complete search history.

(56) References Cited

U.S. PATENT DOCUMENTS

| | | | | |
|---|---|---|---|---|
| 6,128,899 A * | 10/2000 | Oono et al. | ...................... | 60/295 |
| 6,182,443 B1 * | 2/2001 | Jarvis et al. | ...................... | 60/274 |
| 6,823,663 B2 * | 11/2004 | Hammerle et al. | .............. | 60/286 |
| 6,973,776 B2 * | 12/2005 | van Nieuwstadt et al. | ..... | 60/286 |
| 7,062,904 B1 * | 6/2006 | Hu et al. | .......................... | 60/286 |
| 7,334,400 B2 * | 2/2008 | Yan et al. | ......................... | 60/286 |
| 7,610,751 B2 * | 11/2009 | McCarthy et al. | .............. | 60/286 |
| 7,650,746 B2 * | 1/2010 | Hu et al. | .......................... | 60/286 |
| 8,245,500 B2 * | 8/2012 | Fisher et al. | .................... | 60/286 |
| 2004/0116276 A1 * | 6/2004 | Yezerets et al. | ................. | 502/34 |
| 2005/0150212 A1 * | 7/2005 | Pfaeffle et al. | ................. | 60/286 |
| 2006/0179825 A1 * | 8/2006 | Hu et al. | ......................... | 60/297 |
| 2007/0012032 A1 * | 1/2007 | Hu | ................................. | 60/286 |
| 2007/0082783 A1 * | 4/2007 | Hu et al. | ....................... | 477/100 |

(Continued)

FOREIGN PATENT DOCUMENTS

| | | |
|---|---|---|
| CN | 101413418 A | 4/2009 |
| JP | 2004204700 A | 7/2004 |

OTHER PUBLICATIONS

Schmieg, Steven J., Blint, Richard J., and Deng, Ling, "Control Strategy for the Removal of NOx from Diesel Engine Exhaust using Hydrocarbon Selective Catalytic Reduction", SAE International 08FFL-0211, 2008.

(Continued)

*Primary Examiner* — Jesse Bogue

(74) *Attorney, Agent, or Firm* — Cantor Colburn LLP

(57) ABSTRACT

An exhaust gas treatment system for a diesel engine is disclosed. The exhaust gas treatment system includes a hydrocarbon selective catalytic reduction catalyst (HC-SCR) in fluid communication with a diesel engine to receive an exhaust gas flow therefrom. The system also includes a two-way catalyst in fluid communication with the HC-SCR to receive the exhaust gas flow therefrom, the two-way catalyst comprising a urea selective catalytic reduction catalyst and a diesel particulate filter (DPF).

20 Claims, 7 Drawing Sheets

(56) References Cited

U.S. PATENT DOCUMENTS

| | | | |
|---|---|---|---|
| 2007/0256407 A1* | 11/2007 | Reuter | 60/286 |
| 2007/0277507 A1* | 12/2007 | Yan | 60/286 |
| 2008/0041045 A1* | 2/2008 | Zhan | 60/301 |
| 2008/0066454 A1* | 3/2008 | Viola | 60/286 |
| 2008/0066456 A1 | 3/2008 | Schmieg et al. | |
| 2008/0069743 A1* | 3/2008 | Castellano et al. | 422/177 |
| 2008/0070778 A1 | 3/2008 | Castellano et al. | |
| 2008/0127634 A1* | 6/2008 | Cho et al. | 60/286 |
| 2008/0131345 A1* | 6/2008 | Vitse et al. | 423/239.1 |
| 2008/0202107 A1* | 8/2008 | Boorse et al. | 60/301 |
| 2008/0236142 A1* | 10/2008 | Sloane | 60/274 |
| 2009/0100825 A1 | 4/2009 | Hiranuma et al. | |
| 2010/0077739 A1* | 4/2010 | Rodman et al. | 60/301 |
| 2010/0101221 A1* | 4/2010 | Charbonnel et al. | 60/301 |
| 2010/0192545 A1* | 8/2010 | Schmieg et al. | 60/286 |
| 2010/0251700 A1* | 10/2010 | Wan et al. | 60/287 |

OTHER PUBLICATIONS

Viola, Michael B., "HC-SCR Catalyst Performance in Reducing NOx Emissions from a Diesel Engine Running Transient Test Cycles", SAE International 2008-01-2487, 2008.

Majewski, W. Addy. "NOx Adsorbers." DieselNet Technology Guide—Diesel Catalysts. http://www.DieselNet.com. Copyright, Ecopoint Inc. Revision 2007.10b.

Majewski, W. Addy. "Lean NOx Catalyst." DieselNet Technology Guide—Diesel Catalysts. http://www.DieselNet.com. Copyright, Ecopoint Inc. Revision 2004.01.

Notification of German Office Action; dated Jan. 9, 2014 for application 10 2010 23 819.8, pp. 1-7.

* cited by examiner

EXHAUST GAS TREATMENT SYSTEM INCLUDING AN HC-SCR AND TWO-WAY CATALYST AND METHOD OF USING THE SAME

FIELD OF THE INVENTION

Exemplary embodiments of the present invention are related to exhaust gas treatment systems, and, more specifically, to an exhaust gas treatment system for a diesel engine and a method of using the same.

BACKGROUND

Manufacturers of internal combustion engines develop engine operation control strategies to satisfy customer demands and meet various regulations for emission control and fuel economy. One such engine control strategy comprises operating an engine at an air/fuel ratio that is lean of stoichiometry to improve fuel economy and reduce greenhouse gas emissions. Such operation is possible using both compression-ignition (diesel) and spark-ignition engines. When an engine operates with a lean (excess oxygen) air/fuel ratio, the resultant combustion temperature and excess oxygen leads to higher engine-out $NO_X$; however, commercial application of lean-operating engines is limited due to lack of effective methods to remove $NO_X$ from an exhaust gas flow under lean exhaust conditions. Thus, efficient reduction of nitrogen oxides ($NO_X$=$NO$+$NO_2$) from lean-burn diesel and gasoline engine exhaust is important to meet future emission standards and improve vehicle fuel economy.

Reduction of $NO_X$ emissions from an exhaust feedstream containing excess oxygen is a challenge for vehicle manufacturers. By way of example, it is estimated that compliance with Bin 5 regulations in the United States may require an aftertreatment system capable of 70-90% $NO_X$ conversion efficiency on the FTP (Federal Test Procedure) cycle based on currently anticipated engine-out $NO_X$ levels. For practical application, the conversion efficiency must be obtained over a range of relatively low operating temperatures (e.g., 200-350° C.) occurring during the aforementioned FTP cycle and at a relatively higher range of operating temperatures (e.g., 450-550° C.) occurring during a high speed test cycle (e.g., US06 federal test procedure).

Various exhaust gas treatment systems have been proposed for vehicle applications under these lean-burn operating conditions. One approach combines a $NO_X$ storage reduction catalyst in series with a downstream diesel particulate $NO_X$ reduction system and a further downstream diesel oxidation catalyst. Targeted performance of 75-85% $NO_X$ reduction has been reported for such systems. However, such systems require periodic catalyst regeneration involving fuel injection to generate high exhaust gas temperatures and injection of reductants to regenerate the storage material of the catalyst. During periods of catalyst regeneration, maintaining the targeted $NO_X$ reduction levels during operation of the vehicle becomes problematic, since the components being regenerated will have greatly reduced $NO_X$ conversion capability.

Accordingly, there remains a need for effective exhaust gas treatment systems and methods of using the same to selectively reduce $NO_X$ in the exhaust gas flows of lean-burn internal combustion engines, particularly those used in various vehicular applications.

SUMMARY OF THE INVENTION

In one exemplary embodiment of the present invention, an exhaust gas treatment system for a diesel engine is provided. The exhaust gas treatment system includes a hydrocarbon selective catalytic reduction catalyst (HC-SCR) in fluid communication with a diesel engine to receive an exhaust gas flow therefrom. The system also includes a two-way catalyst in fluid communication with the HC-SCR to receive the exhaust gas flow therefrom, the two-way catalyst comprising a urea selective catalytic reduction catalyst and a diesel particulate filter (DPF).

In another exemplary embodiment of the present invention, a method of using an exhaust treatment system comprising an HC-SCR catalyst in fluid communication with a diesel engine to receive an exhaust gas flow therefrom; a two-way catalyst in fluid communication with the HC-SCR to receive the exhaust gas flow therefrom; a first injection device that is configured to periodically and selectively inject a hydrocarbon, CO or $H_2$ material, or combination thereof, into the exhaust gas flow between the HC-SCR and the engine; a second injection device that is configured to periodically and selectively inject urea or ammonia, or a combination thereof, into the exhaust gas flow between the HC-SCR and the two-way catalyst; and a controller that is configured to control operation of the engine and periodic and selective injection of the hydrocarbon, CO or $H_2$ material, or combination thereof, and periodic and selective injection of the urea or ammonia, or combination thereof, and determine an amount of NOX in the exhaust gas flow; is provided: The method includes operating the engine to produce the exhaust gas flow. The method also includes periodically and selectively injecting at least one of the hydrocarbon, CO or $H_2$ material, or a combination thereof, or the urea or ammonia, or a combination thereof, into the exhaust gas flow using the controller, wherein the exhaust gas flow from the engine has a first volume fraction of $NO_X$ ($NO_{X1}$) and the exhaust gas flow exiting the two-way catalyst has a predetermined second volume fraction of $NO_X$ ($NO_{X2}$).

In yet another exemplary embodiment of the present invention, a diesel engine and exhaust gas treatment system are provided. The engine and exhaust gas treatment system includes a diesel engine, an HC-SCR catalyst in fluid communication with a diesel engine to receive an exhaust gas flow therefrom; and a two-way catalyst in fluid communication with the HC-SCR to receive the exhaust gas flow therefrom, the two-way catalyst comprising a urea selective catalytic reduction (two-way) catalyst and a diesel particulate filter (DPF).

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

In accordance with exemplary embodiments of the present invention, improved exhaust gas treatment systems and methods for treatment of exhaust gas emissions from diesel engines are provided. The present invention provides the potential for reduced and controlled exhaust emissions, including emissions of $NO_x$, CO, HC and diesel particulates (PM), while improving overall packaging for the exhaust gas treatment system. The present invention also provides the potential for enhanced emission control strategies and methods, including strategies and methods, for example, that minimize the consumption of hydrocarbon (e.g., fuel) or urea needed to achieve reduced exhaust emissions, or that minimize the need for regeneration to remove accumulated sulfur compounds, and thereby extend the operating life of the exhaust system components. This is achieved through the use of advantageous combinations of exhaust system components or devices that are particularly suited for synergistic interaction with one another during operation of diesel engines to cause emission reduction, as well as implementation of control strategies and methods that make use of these advantageous combinations.

Figure 1:
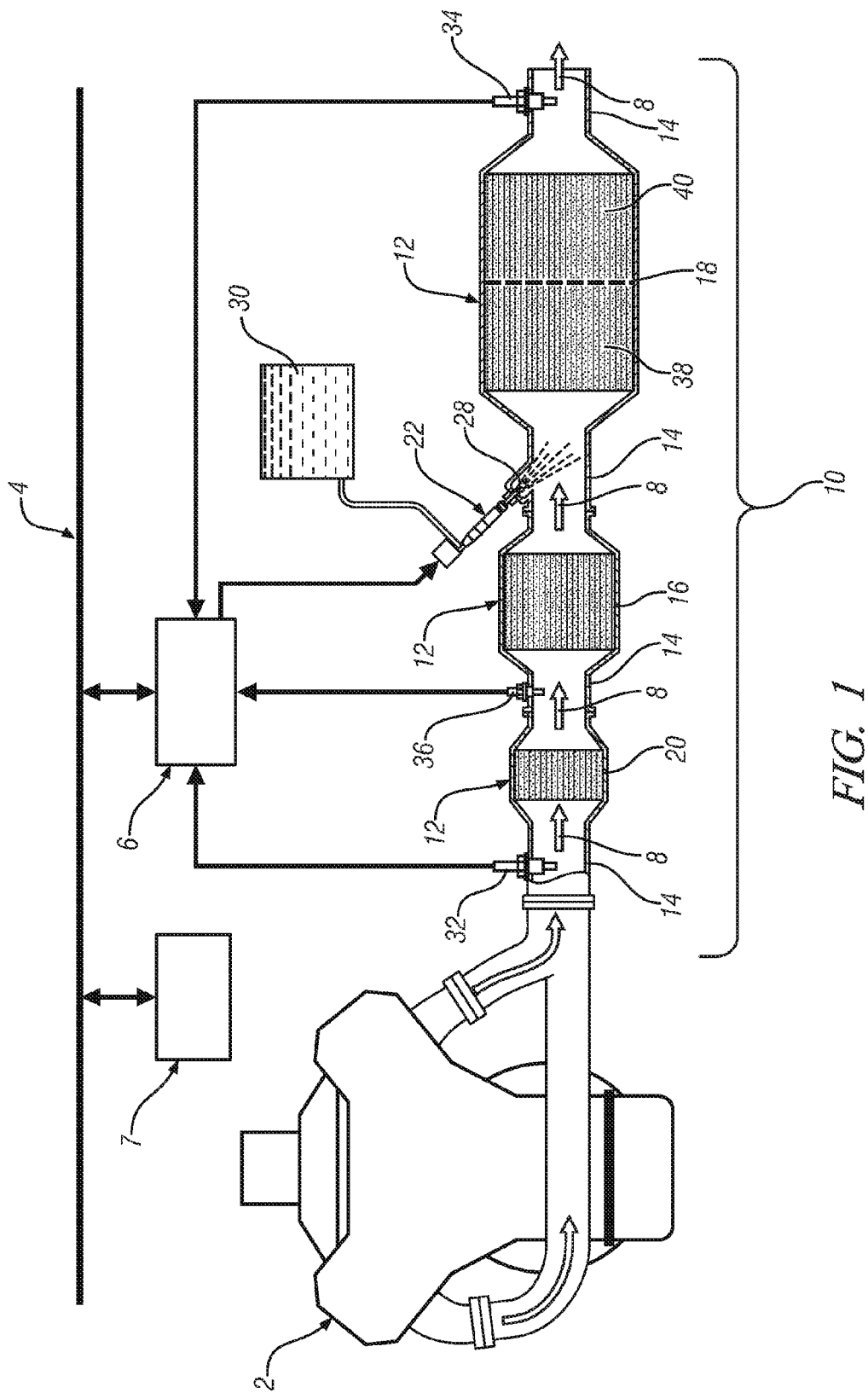
FIG. 1 is a schematic illustration of an exemplary embodiment of an exhaust gas treatment system as disclosed herein.
Figure 2:
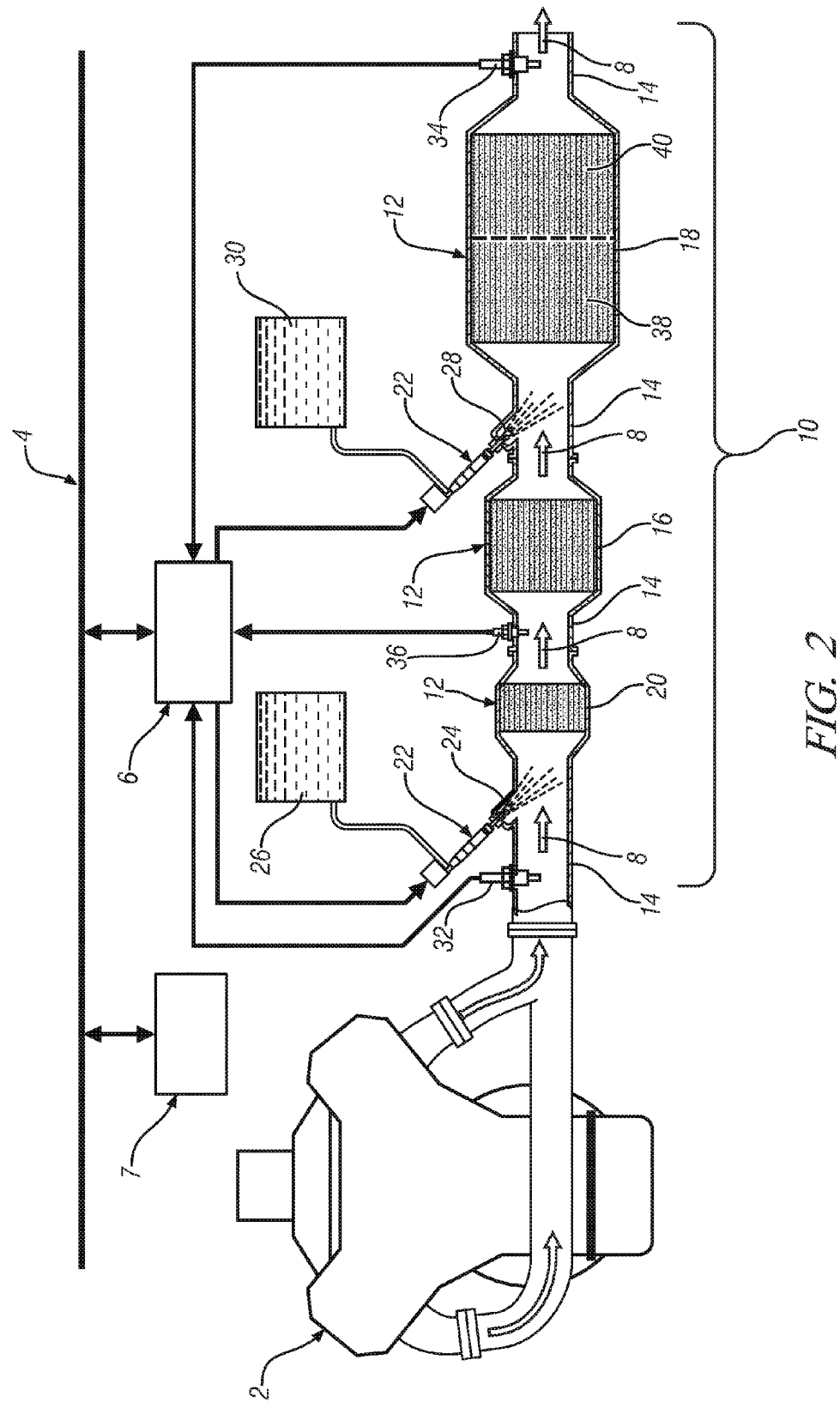
FIG. 2 is a schematic illustration of a second exemplary embodiment of an exhaust gas treatment system as disclosed herein.

In general, referring to the configuration shown in FIG. 1, a schematic diagram depicts an embodiment of an internal combustion diesel engine 2, control system 4, and engine exhaust gas treatment system 10, in accordance with the present invention. The exemplary diesel engine 2 and control system 4 comprises a four-cycle internal combustion diesel engine 2 and electronic engine control module (ECM) 6 that may be configured to accomplish control within exhaust gas flow 8 in accordance with control methods and strategies described herein. The engine may include a known compression-ignition engine having an operating regime that is primarily lean of stoichiometry. Alternatively, diesel engine 2 may include an engine configured to employ any one of a number of engine configurations and associated engine control strategies, and which also include those having an operational regime (or regimes) that is lean of stoichiometry, e.g., homogeneous-charge compression-ignition engines. Diesel engine 2 includes a plurality of reciprocating pistons (not shown) attached to a crankshaft (not shown), which may be operably attached to a driveline, such as a vehicle driveline (not shown), to deliver tractive torque to the driveline. Diesel engine 2 may be any diesel engine configuration or application, including various vehicular applications (e.g., automotive, marine and the like), as well as various non-vehicular applications (e.g., pumps, generators and the like). During operation, diesel engine 2 generates an exhaust gas feedstream or flow represented by arrows 8 containing regulated and unregulated emission constituents, generally including constituent gases and particulate matter. Exhaust gas treatment system 10 acts to convert regulated constituents, such as, for example, various hydrocarbons (HC), carbon monoxide (CO), nitrides of oxygen ($NO_X$) and particulate matter (PM), to unregulated constituents, such as, for example, carbon dioxide ($CO_2$), nitrogen ($N_2$) and water ($H_2O$).

Exhaust gas treatment system 10 comprises an integrated system intended to convert the regulated constituent elements of the exhaust gas flow 8 to unregulated constituents. Exhaust gas treatment system 10 is in fluid communication with diesel engine 2. As used herein, fluid communication refers to the passage of the exhaust gas flow 8 from one component 12 or device of the exhaust treatment system to another component 12 or device of the system, and may be established through any suitable fluid communication device, including an exhaust conduit, such as pipe 14, or an exhaust manifold (not shown) or a housing, such as a metal can, of an exhaust treatment component 12 or device, or combination thereof. Fluid communication may be from one component 12 to another component 12, or from one component to a plurality of components, or conversely from a plurality of components to a single component, and includes communication from the engine 2 to a component and final exhaust from a component to the external environment. Exhaust gas treatment system 10 includes an HC-SCR catalyst 16 and a two-way catalyst 18, each of which are configured to treat at least one emission constituent within the exhaust gas flow 8 produced by operation of diesel engine 2. The HC-SCR catalyst 16 is configured for fluid communication with diesel engine 2 and is configured to receive the exhaust gas flow 8 therefrom. HC-SCR catalyst 16 includes a catalyst disposed on a substrate, such as a flow-through monolith, as described herein. The two-way catalyst 18 is configured for fluid communication with the HC-SCR catalyst 16 and is configured to receive the exhaust gas flow 8 therefrom. Two-way catalyst 18 includes a catalyst disposed in a substrate, such as a wall-flow monolith, as described herein.

As shown in FIG. 1, exhaust gas treatment system 10 may also optionally include a diesel oxidation catalyst (DOC) 20. In the specific combination shown, the DOC 20 is located upstream from the HC-SCR catalyst 16, which is further upstream from the two-way catalyst 18. As used herein, one component being located upstream with reference to another component in the context of the exhaust gas treatment system 10 generally means that it is relatively closer to engine 2 as the source of the exhaust flow 8, or that exhaust gas flow 8 arrives at the upstream component 12 prior to the other component 12.

Figure 3:
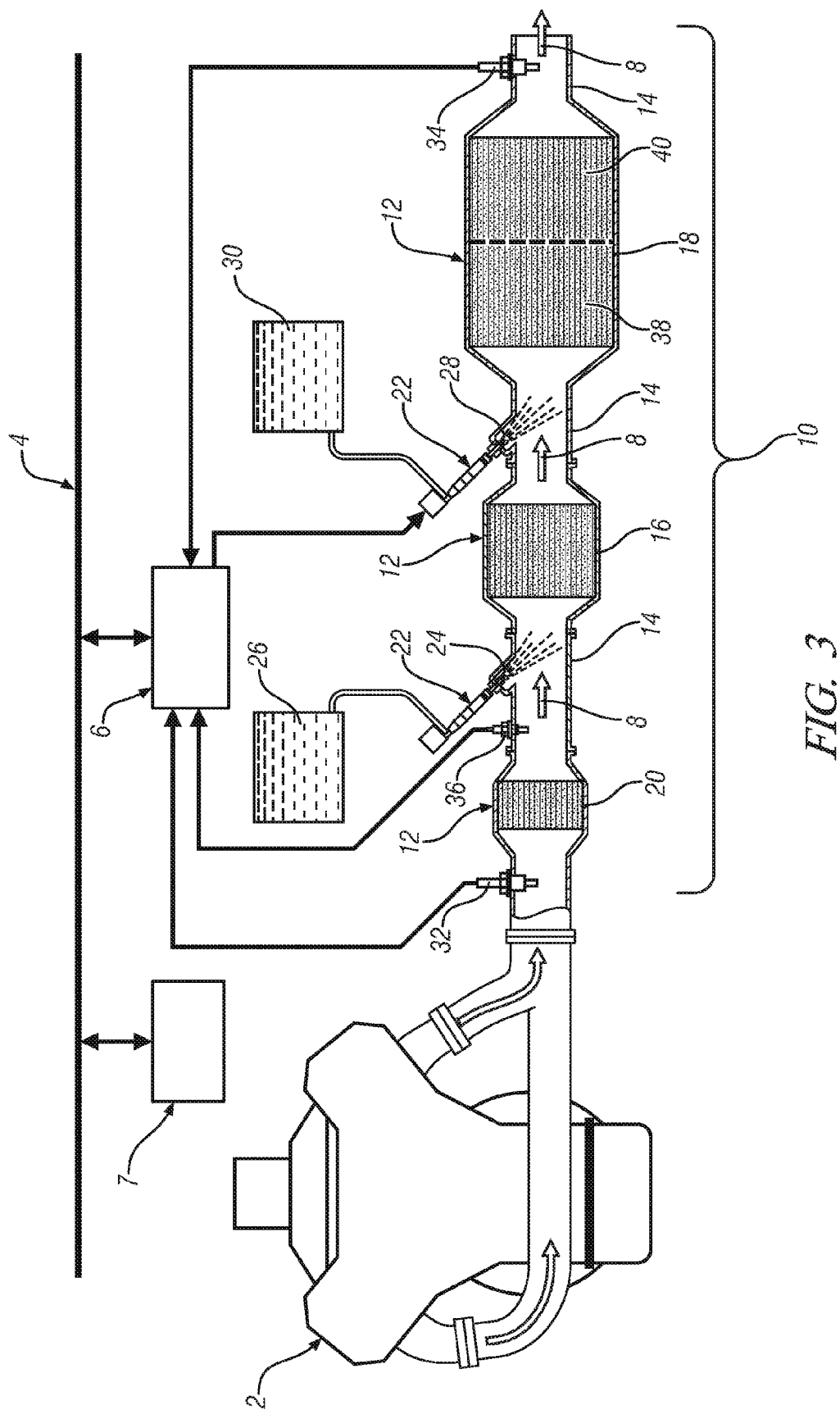
FIG. 3 is a schematic illustration of a third exemplary embodiment of an exhaust gas treatment system as disclosed herein.

Exhaust gas treatment system 10 may also include one or more dosing devices 22, such as a fluid injector, for dosing of reactant materials for interaction with the components 12 of the exhaust gas treatment system and treatment of the exhaust gas flow 8 as described herein. Referring to FIGS. 2-7, various embodiments of exhaust gas treatment system 10 include a hydrocarbon (HC) dosing device 24, such as a fuel injector, for injecting a controlled amount of an HC reductant from an HC source, such as HC reservoir 26, upstream of the HC-SCR catalyst 16 as shown in FIGS. 2, and 4-7. As used herein, the term "HC reductant" may include a suitable hydrocarbon (HC), it may also include CO or $H_2$ material, or a combination thereof. For example, a hydrocarbon, such as diesel fuel, may be reformed over a suitable reformer catalyst to provide CO and $H_2$. Once reformed, the hydrocarbon, CO or $H_2$, or any combination thereof, may be injected into exhaust gas flow 8. Where DOC 20 is used upstream of the HC-SCR catalyst 16, the HC dosing device 24 may be located upstream of DOC 20 in order to consume oxygen in exhaust gas flow 8 via oxidation of the HC as it passes through DOC 20, including operation of the HC dosing device 24 to consume substantially all of the oxygen in exhaust gas flow 8. This would provide the fuel rich conditions in which HC-SCR catalyst 16 can reduce the $NO_X$ to $N_2$. Oxidation of HC in DOC 20 would also provide exothermic conditions and generate heat to promote increased soot oxidation in HC-SCR catalyst 16, or possibly also in two-way catalyst 18. Alternately, HC dosing device 24 may be located downstream of DOC 20 as shown in FIG. 3; however, embodiments having this configuration do not enjoy the benefit of oxidation of the HC in DOC 20. An example of a suitable HC reductant reservoir 26 would be a fuel tank or portion of a fuel conduit, including a high or low pressure portion of a fuel injection system, such as a common rail fuel injection system. The HC reductant dosing device 24 is operably connected to the ECM 6, which is adapted to control timing and quantity of HC reductant injection, typically in the form of engine fuel, to the exhaust gas flow 8. Alternatively, as illustrated in the embodiment of FIG. 1, unburned hydrocarbons from engine 2 (e.g., unburned fuel or engine-out HC) may be used as an HC reductant material to reduce $NO_X$ in the HC-SCR catalyst 16 and promote the other aspects described above using DOC 20, such as, for example, by using a post-injection control strategy.

Referring to FIGS. 1-7, various embodiments of exhaust treatment system 10 also include a urea dosing device 28, such as a urea injector, for injecting a controlled amount of urea or ammonia as a reductant from a urea reservoir 30 upstream of the two-way catalyst 18. As used herein, the term urea may also include the use of ammonia ($NH_3$) as a reductant, since the urea decomposes to produce ammonia as a reaction by-product, and it is the ammonia that is used as a reactant species in the catalytic reactions that occur in two-way catalyst 18. An example of a suitable urea reservoir would be a urea tank. The urea dosing device 28 is operably connected to the ECM 6, which is adapted to control timing and quantity of urea injection into the exhaust gas flow 8. When urea is used as the reductant, injection should occur sufficiently upstream from two-way catalyst 18 to enable the decomposition of the urea to ammonia prior to entry into two-way catalyst 18.

The exhaust gas treatment system 10 and control system 4 may include one or more sensing devices and systems that are configured for signal communication with ECM 6. Control system 4 may also include a user interface 7 (UI) for displaying system information to a user, including information obtained using any of the sensors described herein, as well as information associated with any of the operating methods or modes described herein. The sensing devices include a $NO_X$ sensor 32 operative to determine the amount of $NO_X$ in the exhaust gas flow 8 as it exits engine 2. The $NO_X$ sensor 32 preferably comprises a sensor operative to generate an electrical signal correlatable to a parametric value for $NO_X$ concentration in the exhaust gas feedstream, and further operative to generate a second electrical signal correlatable to a parametric value for air/fuel ratio of the exhaust gas feedstream, from which oxygen content can be determined. The $NO_X$ sensor 32 may be used in conjunction with control system 4 to affect control of engine 2 and exhaust gas treatment system 10, including dosing devices 22.

The exhaust gas sensing devices also include exhaust gas sensing device 34. Exhaust gas sensing device 34 may include a second $NO_X$ sensor, operative to generate an electrical signal correlatable to a parametric value for $NO_X$ concentration in the exhaust gas feedstream 8. Alternatively, exhaust gas sensing device 34 may include a virtual sensing device, wherein $NO_X$ concentration in the exhaust gas feedstream is determined based upon engine operating conditions, which is a known technique. Exhaust gas sensing device 34 may be located downstream of the first $NO_X$ sensor 32, such as downstream of the two-way catalyst 18 so that the amount of $NO_X$ exiting exhaust treatment system 10 may be determined. Exhaust gas sensing device 34 may also be used in conjunction with control system 4 to affect control of engine 2 and exhaust gas treatment system 10.

The sensing devices may also include a temperature sensor 36 or a plurality of temperature sensors 36 (not shown), operative to measure the temperature of exhaust gas flow 8 within exhaust gas treatment system 10 for use in conjunction with control system 4 to affect control of engine 2 and exhaust gas treatment system 10. As an example, temperature sensor 36 may be located between the DOC catalyst 20 and HC-SCR catalyst 16 to determine an operating temperature of the HC-SCR catalyst 16. Similarly, a temperature sensor 36 may be located between the HC-SCR catalyst 16 and the two-way catalyst 18 to determine an operating temperature of the two-way catalyst 18.

Referring to the exemplary embodiments of FIGS. 2-7, the DOC 20 is in fluid communication with the engine 2 and, with reference to the exhaust gas flow 8, is located upstream from the HC-SCR catalyst 16 and is configured to oxidize certain constituents of the exhaust gas flow 8 to produce unregulated by-products or constituents that are adapted for further treatment in other components of exhaust treatment system 10, as described herein. Generally, the DOC 20 is a flow-through device that consists of a metal or ceramic monolith or substrate having a honeycomb-like structure that includes a plurality of generally parallel, longitudinally-extending, interconnected cells that provide a network comprising a plurality of flow channels for receiving exhaust gas flow 8 and are separated by a corresponding network of cell walls. The substrate has a large surface area along the cell walls. The cell walls have a washcoat that includes a porous ceramic matrix with a surface that is coated with a catalytically active amount of a platinum group metal catalyst. Suitable platinum group metals include Pt, Pd, Rh, Ru, Os or Ir, or a combination thereof. Of these, Pt or Pd, or combinations thereof, including alloys thereof, are particularly useful. As the exhaust gas flow 8 traverses the length of the DOC 20, particularly the flow channels and the washcoated cell walls, the platinum group metal catalyst catalyzes the oxidation of CO to $CO_2$, as well as catalyzing the oxidation of various hydrocarbons (HC), including gaseous hydrocarbons and liquid hydrocarbon particles, including unburned fuel or oil, or fuel or other HC reductants that are introduced into exhaust gas treatment system to form $CO_2$ and $H_2O$, thereby reducing harmful emissions. In one configuration, during an advanced combustion operation of the engine, the control system 4 or ECM 6 may be used to cause combustion resulting in a higher level of HC in the exhaust gas flow 8 than is generated with stoichiometric air/fuel mixtures during normal combustion. The DOC 20 is configured to catalyze the decomposition of at least a portion of the increased amounts of HC in order to reduce, or alternately to prevent, the HC in the exhaust gas flow from reaching the two-way catalyst 18 and poisoning this device by reducing its ability to catalyze $NO_X$, or from reaching the external environment by release from the exhaust gas treatment system 10.

The DOC 20 may be configured to convert various regulated exhaust constituents to other regulated or unregulated exhaust constituents through oxidation. For example, the DOC 20 may be configured to oxidize hydrocarbons (HC) to carbon dioxide $CO_2$ and water ($H_2O$), convert carbon monoxide (CO) to carbon dioxide ($CO_2$) convert sulfur dioxide ($SO_2$) to sulfur trioxide ($SO_3$) and/or sulfuric acid ($H_2SO_4$) and convert nitrogen oxide (NO) to nitrogen dioxide ($NO_2$), or otherwise. Below are exemplary oxidation reactions contemplated with the DOC 20 of the present invention.

$$HC + O_2 = CO_2 + H_2O \quad (1)$$

$$CO + 1/2 O_2 = CO_2 \quad (2)$$

$$2SO_2 + O_2 = 2SO_3 \quad (3)$$

$$SO_3 + H_2O = H_2SO_4 \quad (4)$$

$$NO + 1/2 O_2 = NO_2 \quad (5)$$

It should be appreciated that the DOC 20 may be configured to perform any one of the above conversions, combinations of the above conversions, or even all of the above conversions, depending on the reactant compounds and their concentrations found in the exhaust gas flow 8, the temperature of DOC 20, and the platinum group metals selected as the catalyst. Other oxidations are contemplated as well, such as oxidation of aldehydes, polycyclic aromatic hydrocarbons or otherwise. Further, the reactions in DOC 20 may be used to reduce the odor of certain emission components.

DOC 20 is housed within a housing (not shown), including a metal housing, such as a metal can having an inlet opening and outlet opening, or otherwise, configured for providing support and directing fluid flow to the DOC. The housing may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of DOC 20 to an exhaust pipe and/or another component of the exhaust gas treatment system 10. It should be appreciated that DOC 20, including the housing, may include one or more additional components for facilitating in operation of DOC 20, or exhaust gas treatment system 10, or control system 4, including, but not limited to, various gas or temperature sensors, injectors (urea or fuel injectors) or otherwise. Such additional features may be particularly advantageous for monitoring characteristics of the exhaust gas, such as flow rate of certain emission components (e.g., particulate matter or otherwise), which may be particularly advantageous for determining the necessity of initiating a regeneration process of the HC-SCR catalyst 16 or two-way catalyst 18.

In one particular configuration, DOC 20 is configured to oxidize nitrogen oxide within exhaust gas flow 8 to nitrogen dioxide (see equation 5). This is advantageous as this conversion assists with the overall $NO_X$ conversion process by enabling subsequent reduction to nitrogen by the two-way catalyst 18 when the proper conditions for this reaction exist within exhaust gas treatment system 10. Oxidation of nitrogen and the other constituents described herein is promoted under lean burn conditions which have relatively higher $O_2$ levels and lower HC levels, which conditions can be affected using control system 4, including the ECM 6. Accordingly, placement of DOC 20 upstream from the HC-SCR catalyst 16, between the engine and the HC-SCR catalyst 16, is particularly advantageous. It is also particularly advantageous to locate DOC 20 proximate the engine, preferably as close to the engine as possible, in order to maintain an operating temperature within DOC 20 of at least about 356° F. (180° C.), and more preferably in the range of about 482° F. (250° C.) to about 842° F. (450° C.).

As mentioned above, referring to FIGS. 1-7, the HC-SCR catalyst 16 is located downstream (relatively farther from the engine and further along the exhaust gas flow path 8) from engine 2 and DOC 20 (FIGS. 2-7), between the DOC 20 (when employed) and the two-way catalyst 18, and is configured to convert certain constituents of the exhaust gas flow 8 to produce unregulated by-products or regulated constituents that are adapted for further treatment in other components of exhaust treatment system 10, as described herein. The HC-SCR catalyst 16 includes a ceramic flow-through monolith with a catalyst washcoat disposed on the walls of the monolith. HC-SCR catalyst 16 may include a single ceramic monolith. Alternately (not shown), HC-SCR catalyst 16 may also include a plurality of ceramic monoliths in a parallel configuration, serial configuration, or a combination thereof, such as, for example, to increase surface area and thus the volume of $NO_X$ that may be converted by HC-SCR catalyst 16. When a plurality of ceramic monoliths is used, they may be disposed in a plurality of housings, or together in a single housing, or a combination thereof Generally, the HC-SCR catalyst 16 is a flow-through device that includes a ceramic monolith or substrate having a honeycomb-like structure that includes a plurality of generally parallel, longitudinally-extending, interconnected cells that provide a network comprising a plurality of flow channels for receiving exhaust gas flow 8 and are separated by a corresponding network of cell walls. The substrate has a large surface area along the cell walls. The cell walls have a washcoat that includes a porous matrix with a surface that is coated with a catalytically active amount of a catalyst. The catalyst may include a platinum group metal catalyst. Suitable platinum group metals include Pt, Pd, Rh, Ru, Os or Ir, or a combination thereof, including alloys thereof Of these platinum group metals, Pt, Pd or Rh, or combinations thereof, including alloys thereof, are particularly useful. For platinum group metal catalysts, a suitable material for a porous matrix includes various metal oxide ceramics. Of the metal oxide ceramics, alumina ($Al_2O_3$) is particularly useful. An example of a suitable platinum group metal ceramic porous matrix is Pt/$Al_2O_3$. The catalyst may also include a base metal catalyst. Suitable base metals include Cu or Ag, or a combination thereof, including alloys thereof For base metal catalysts, a suitable material for a porous matrix includes various zeolites. An example of a suitable base metal catalyst and zeolite porous matrix is a Cu exchanged zeolite, such as Cu/ZSM-5. HC-SCR catalysts 16 that employ platinum group metal catalysts are effective to catalyze the reactions described herein at relatively low temperatures (e.g., about 200° C.), but have a narrow temperature range over which they are effective, and are not effective to catalyze the reactions described herein at relatively higher temperatures, such as temperatures above about 275° C. The base metal catalysts are effective to catalyze the reactions described herein at relatively higher temperatures, such as above about 325° C., but are not effective to significantly catalyze these reactions at lower temperatures. Given the differing performance of the catalyst materials, in an exemplary embodiment, HC-SCR catalyst 16 may include a ceramic monolith having a washcoat or plurality of washcoats that includes both a platinum group metal catalyst and a base metal catalyst that are axially separated along the length of the ceramic monolith. In another exemplary embodiment that includes a plurality of ceramic monoliths, one ceramic monolith may include a platinum group metal catalyst and a second ceramic monolith may include a base metal catalyst.

As the exhaust gas flow 8 traverses the length of the HC-SCR 16, particularly the flow channels and the washcoated cell walls, the platinum group metal catalyst or base metal catalyst, or a combination thereof, catalyzes various reactions as described herein. In one particular configuration, HC-SCR catalyst 16 is configured to oxidize nitrogen oxide (NO) within an exhaust gas flow 8 to nitrogen dioxide $NO_2$) as well as other oxidation reactions similar to those of DOC 20 (see equations 1-5). This is also advantageous as this conversion assists with the overall $NO_X$ conversion process by enabling subsequent reduction to nitrogen by the two-way catalyst 18 when the proper conditions for this reaction exist within exhaust gas treatment system 10. This occurs under lean burn conditions which have relatively higher $O_2$ levels and lower HC levels, which conditions can be affected using control system 4, including the ECM 6. In this same configuration, HC-SCR 16 may also be used to reduce $NO_X$ within exhaust gas flow 8 to nitrogen ($N_2$) when the proper conditions for this reduction reaction exists within an exhaust gas treatment system 10, such as under conditions with relatively higher engine out HC levels where the $O_2$ that would otherwise promote the oxidization described has been consumed. This reduction reaction may also occur where relatively higher HC levels are obtained by the direct injection of HC upstream of HC-SCR catalyst 16 using the configuration of FIGS. 2 and 4-7, which conditions can be affected using control system 4, including the ECM 6. A exemplary reduction reaction for HC-SCR 16 is provided below:

$$\{HC\} + NO_X = N_2 + CO_2 + H_2O \quad (6)$$

The relative amount of $N_2$, $CO_2$ and $H_2O$ will depend on the nature of the HC selected.

Two-way catalyst 18 includes DPF 38 and a urea selective catalyst reduction (U-SCR) catalyst 40. Two-way catalyst 18 is a wall-flow-device that consists of a ceramic monolith or substrate having a honeycomb-like structure that includes a plurality of generally parallel, longitudinally-extending, interconnected cells that provide a network comprising a plurality of flow channels for exhaust gas flow 8 and are separated by a corresponding network of porous cell walls. The substrate has a large surface area along the cell walls. Alternating adjacent cells have one of the inlet or outlet plugged such that an alternating array of inlets is plugged with inlets of the immediately adjacent cells being open, and an alternating array of outlets is plugged with outlets of the immediately adjacent cells being open. The structure has open pores in the cell walls. Thus, the exhaust gas flow 8 passes into the plurality of inlets and is forced through the porous cell walls and into the adjacent outlet cells where it then flows out the plurality of unplugged outlets. The pores permit the gaseous constituents to pass through the cell walls while the PM is entrapped within the pores, thereby providing the PM filtering action of DPF 38. The U-SCR catalyst 40 is provided as a washcoat disposed on the ceramic wall-flow monolith. The washcoat includes a reduction catalyst disposed on a ceramic matrix. The washcoat may be disposed along the cell walls of the plurality of inlet passages or the plurality of outlet passages or both. In one exemplary embodiment, the washcoat is disposed on the plurality of outlet passages. The washcoat includes a porous matrix with a surface that is coated with a catalytically active amount of a reduction catalyst. The ceramic wall-flow monolith may be made from any suitable ceramic, including cordierite or alumina or the like. Use of two-way catalyst 18 is advantageous because of the space reduction achieved versus the use of a discrete DPF 38 and U-SCR 40, as well as the reduction in the overall number of individual exhaust components.

When control system 4 provides conditions in exhaust gas treatment system 10 richer than a stoichiometric air to fuel ratio, referred to as a rich condition, either by controlling combustion in engine 2 or by direct dosing or injection of HC reductant into the exhaust gas treatment system 10 using HC dosing device 24,. NO is reduced to nitrogen with HC and CO in the exhaust gas, while PM in DPF 38 is further oxidized with the active oxygen thus generated. While the two-way catalyst 18, including DPF 38 and U-SCR 40, system 10 is adapted to provide reduction of $NO_X$ (U-SCR 40) and collection of PM (DPF 38) over the entire operating temperature range of exhaust gas treatment system 10 and engine 2, including typical ambient vehicle storage/starting temperatures of from about −40° F. (about −40° C.) to about 120° F. (about 49° C.) to operating temperatures up to about 1292° F. (about 700° C.). The DPF 38 of two-way catalyst 18 filters soot over the entire operating temperature range of engine 2, including typical ambient vehicle storage/starting temperatures from about −40° F. (about −40° C.) to about 120° F. (about 49° C.) to operating temperatures up to about 1292° F. (about 700° C.). Passive regeneration of DPF 38 and oxidation of the soot particles occurs in the presence of $NO_X$ over the temperature range of 482° F. (250° C.) to about 842° F. (450° C.), whereas active regeneration and oxidation of the soot particles occurs in the presence of $O_2$ at temperatures of about 500° C. or more, and more preferably over the temperature range of about 1112° F. (600° C.) to about 1202° F. (650° C.).

In an exemplary embodiment, the washcoat includes a porous ceramic matrix with a surface that is coated with a catalytically active amount of a base metal catalyst, i.e., an amount sufficient to catalyze the desired chemical reactions. Suitable base metal catalysts include copper (Cu) or iron (Fe), or a combination thereof, including alloys and compounds thereof. The porous matrix may include any suitable porous matrix. Suitable porous matrixes include various zeolites, such as those that comprise alumina, including various alumina silicates. In the case of Cu catalysts, a suitable zeolite is one known commercially as ZSM-5. In another exemplary embodiment, the washcoat of two-way catalyst 18 includes a porous ceramic matrix with a surface that is coated with a catalytically active amount of a base metal catalyst, where the base metal catalyst includes vanadium, including alloys and compounds thereof, such as vanadia ($V_2O_5$). The porous matrix may include any suitable porous matrix. Suitable porous matrices include titania, as well as various zeolites that include titania, such as those that include alumina, including various alumina silicates. Titania porous matrices may also include oxides of tungsten and molybdenum. The use of a base metal catalyst allows conversion of the nitrogen oxides without the use of precious metals.

The two-way catalyst 18 utilizes ammonia to reduce $NO_X$. For example, in an exemplary embodiment, a dosing device 22, such as urea dosing device 28, is provided upstream from the two-way catalyst 18 for introducing urea to the exhaust gas flow stream 8, such as through introduction of a urea solution. The urea is introduced upstream a sufficient distance from two-way catalyst 18 to permit the urea to decompose in the exhaust gas flow 8 to form ammonia prior to entering two-way catalyst 18. In one advantageous configuration, ammonia is also generated within the HC-SCR catalyst 16 and travels downstream to the two-way catalyst 18. In this configuration, reduced amounts of urea are needed due to the ammonia generated in the HC-SCR catalyst 16. Below are exemplary conversion chemical reactions contemplated with the two-way catalyst 18:

Urea decomposition:

$$CO(NH_2)_2 + H_2O \rightarrow 2NH_3 + CO_2 \quad (7)$$

$NO_X$ reduction reactions in two-way catalyst 18:

$$6NO + 4NH_3 \rightarrow 5N_2 + 6H_2O \quad (8)$$

$$4NO + 4NH_3 + O_2 \rightarrow 4N_2 + 6H_2O \quad (9)$$

$$6NO_2 + 8NH_3 \rightarrow 7N_2 + 12H_2O \tag{10}$$

$$2NO_2 + 4NH_3 + O_2 \rightarrow 3N_2 + 6H_2O \tag{11}$$

$$NO + NO_2 + 2NH_3 \rightarrow 2N_2 + 3H_2O \tag{12}$$

It should be appreciated that the two-way catalyst 18 may be configured to perform any one of the above conversions, or combinations of the above conversions, including all of the above conversions. The two-way catalyst 18 begins to function as described above at an operating temperature of at about 356° F. (180° C.), and may be more preferably operated in the range of about 482° F. (250° C.) to about 1022° F. (550° C.).

The two-way catalyst 18 is housed within a housing, such as a metal can, configured to provide support and direct the exhaust gas flow 8 into, through and out of two-way catalyst 18. The housing may have any suitable shape or size including a cylindrical shape. The housing may also include attachment features located proximate to an inlet opening, such as an inlet pipe, and an outlet opening, such as an outlet pipe, for fluid coupling of the two-way catalyst 18 to an exhaust pipe and/or other component of the exhaust gas treatment system 10. It should be appreciated that the two-way catalyst 18, including housing, may include one or more additional components for facilitating operation of the exhaust gas treatment system 10, including, but not limited to, sensors, dosing devices (urea or fuel injectors) or otherwise. Such additional features may be particularly advantageous for monitoring characteristics of the exhaust gas, such as the amounts or flow rates of certain emission constituents, which are particularly advantageous for control of the exhaust gas treatment system 10, including regeneration of the two-way catalyst 18.

Figure 4:
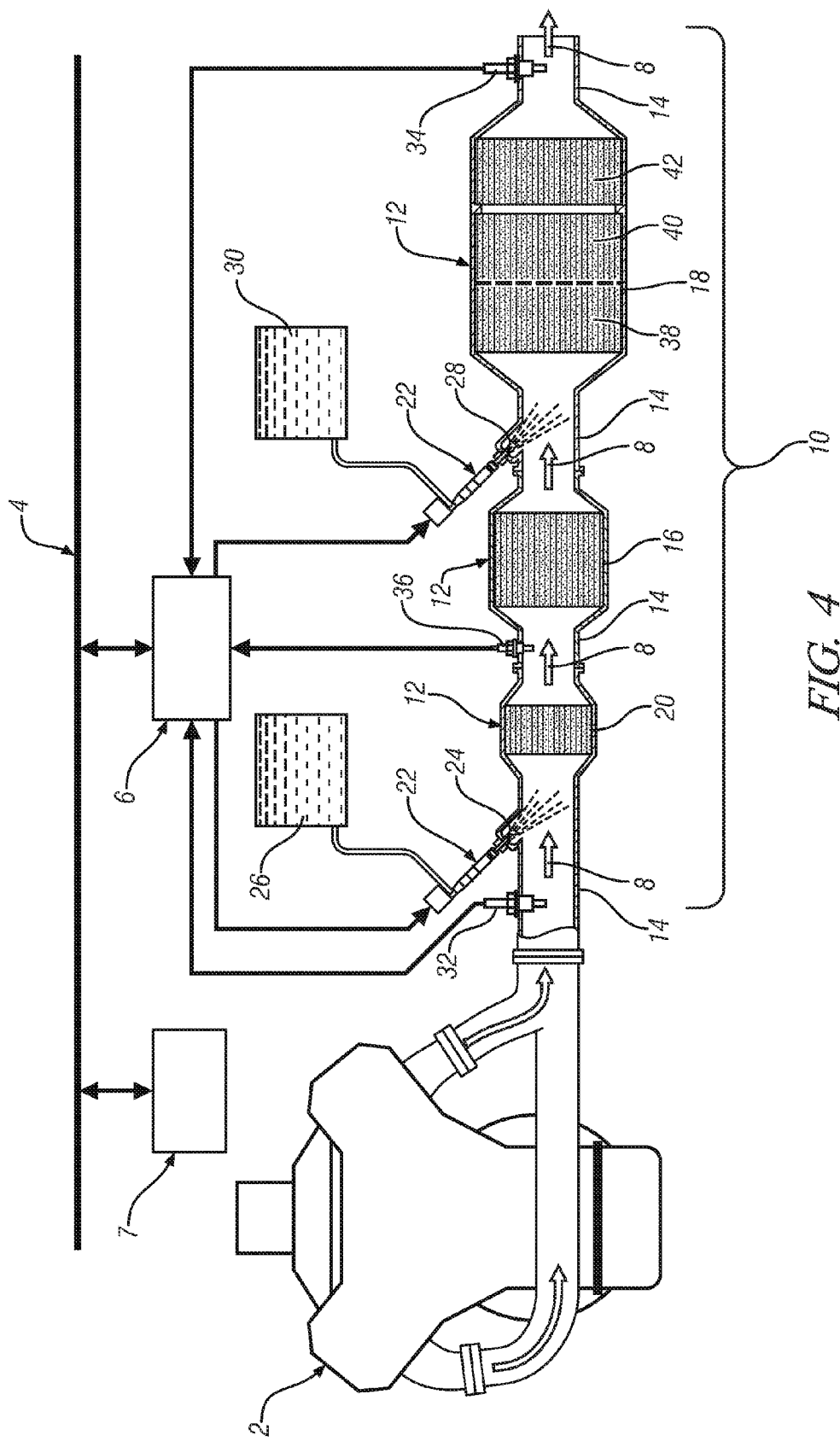
FIG. 4 is a schematic illustration of a fourth exemplary embodiment of an exhaust gas treatment system as disclosed herein.

Referring to FIG. 4, in another exemplary embodiment, exhaust gas treatment system 10 also includes second U-SCR catalyst 42 downstream of two-way catalyst 18, such that it is configured to receive exhaust gas flow 8 from two-way catalyst 18. Second U-SCR catalyst 42 may be used to increase the $NO_X$ conversion capacity of system 10. Second U-SCR catalyst 42 may be configured as a flow-through catalyst as described herein, and may include a ceramic monolith substrate having a catalyst disposed on a washcoat as also described herein. Second U-SCR catalyst 42 may include a copper or iron catalyst material disposed on a porous matrix such as a zeolite matrix, as described herein in conjunction with U-SCR catalyst 40. Second U-SCR catalyst 42 may be housed in the same housing as two-way catalyst 18 and U-SCR catalyst 40, or in a separate housing, such as a metal can. Second U-SCR catalyst 42 is in fluid communication with exhaust conduit 14 for communication of exhaust gas flow 8, such as out of system 10 to an external environment. This configuration may be advantageous where it is desirable to increase the $NO_X$ conversion capacity of system 10 by injection of urea without increasing the size and capacity of two-way catalyst 18, such as where use of a standard size two-way catalyst 18 is employed.

Figure 5:
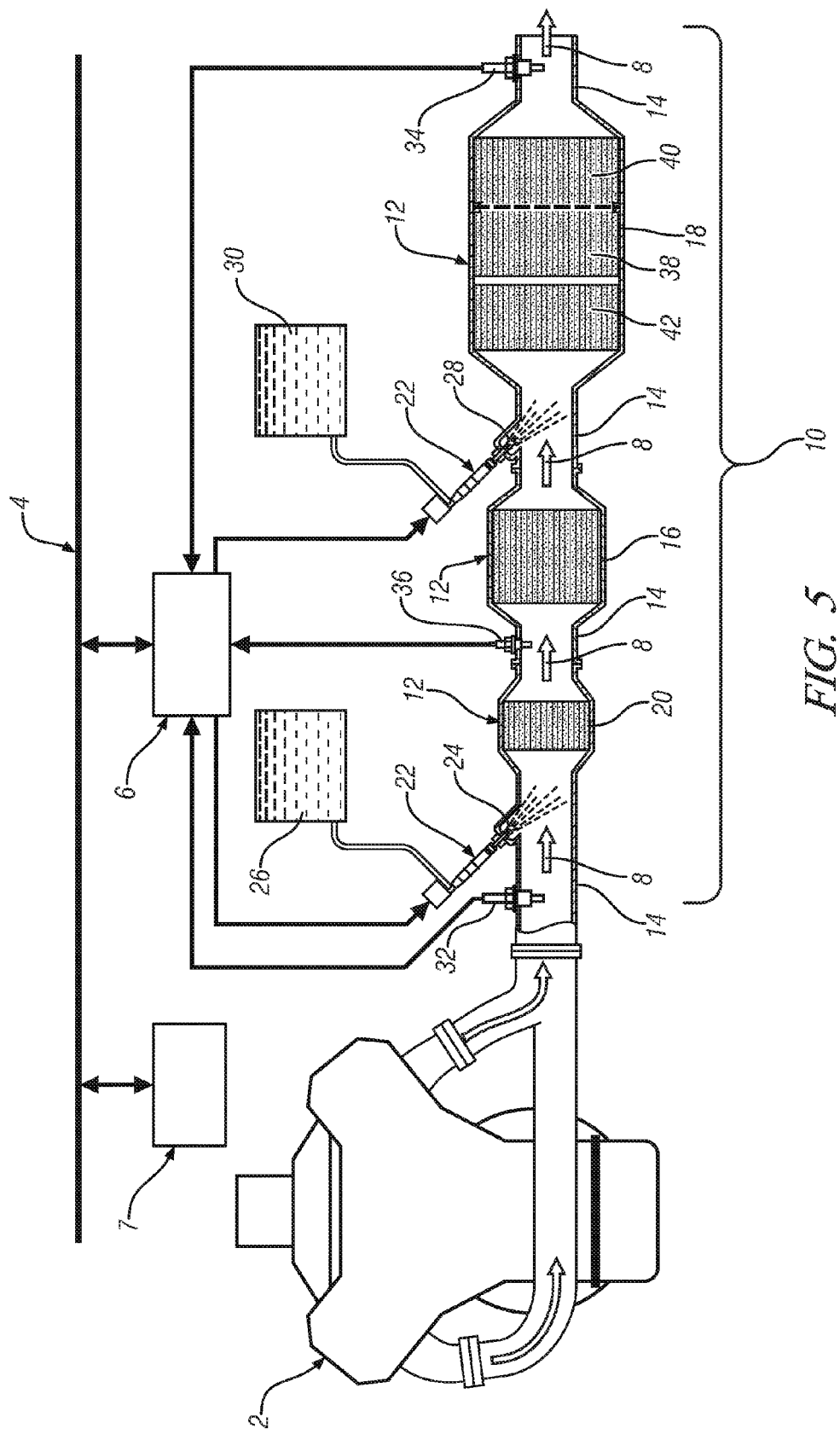
FIG. 5 is a schematic illustration of a fifth exemplary embodiment of an exhaust gas treatment system as disclosed herein.

Referring to FIG. 5, yet another exemplary embodiment of exhaust gas treatment system 10 is illustrated. System 10 includes second U-SCR catalyst 42 as described herein. The principal distinction of this system from that shown in FIG. 4 is that second U-SCR catalyst 42 is located upstream from two-way catalyst 18. Otherwise, second U-SCR catalyst 42 may be configured in the same way as the embodiment thereof illustrated in conjunction with FIG. 4. Again, second U-SCR catalyst 42 may also be housed together with two-way catalyst 18, or in a separate housing. In this embodiment, second U-SCR catalyst 42 also provides additional $NO_X$ conversion capacity to system 10. This configuration may be advantageous where it is desirable to increase the $NO_X$ conversion capacity of system 10 by injection of urea without increasing the size and capacity of two-way catalyst 18, such as where use of a standard size two-way catalyst 18 is employed.

Figure 6:
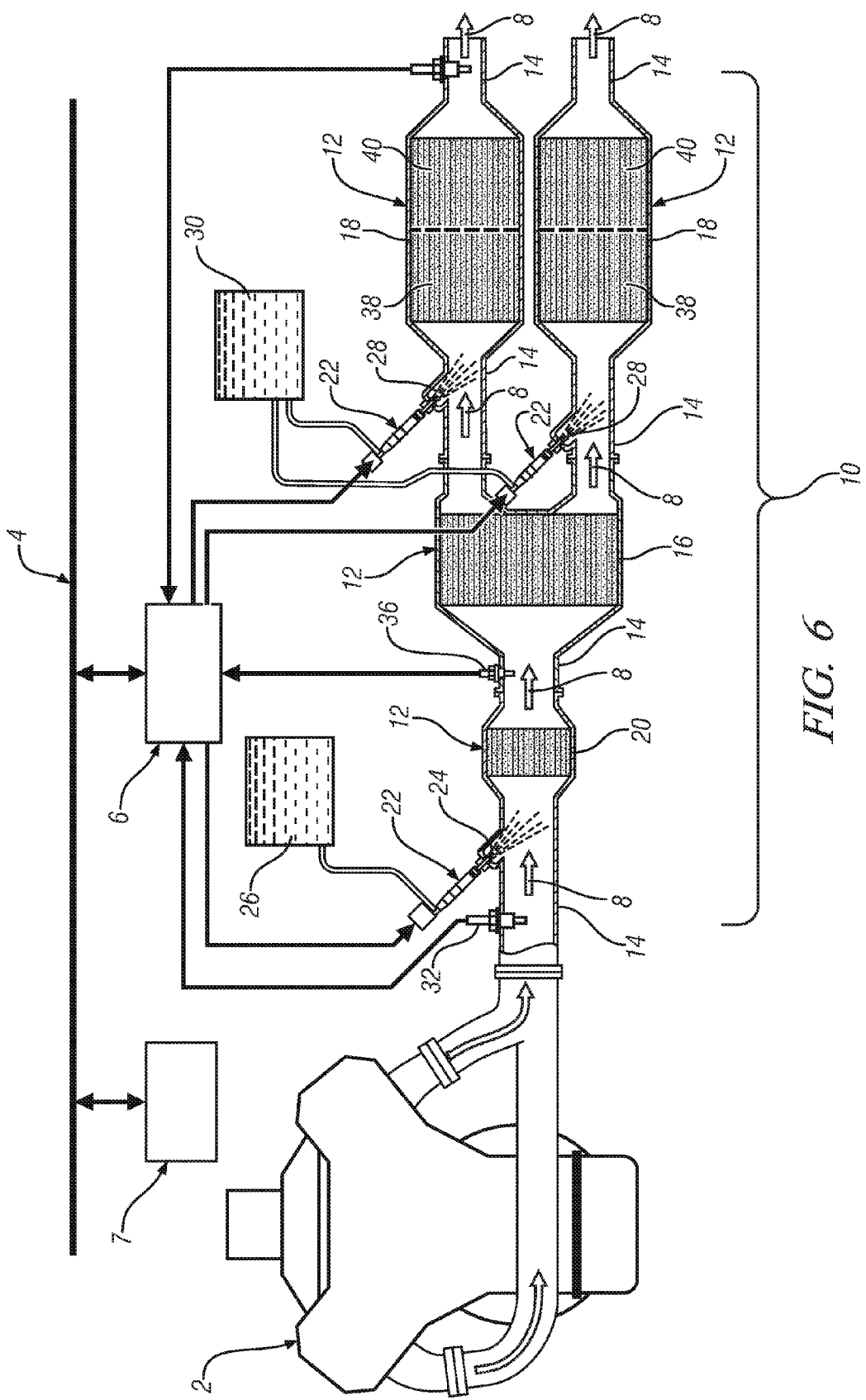
FIG. 6 is a schematic illustration of a sixth exemplary embodiment of an exhaust gas treatment system as disclosed herein.

Referring to FIG. 6, yet another exemplary embodiment of exhaust gas treatment system 10 is illustrated. In this embodiment system 10 includes a plurality of two-way catalysts 18. The plurality of two-way catalysts 18 are employed in parallel with reference to exhaust gas flow stream 8. Each of the plurality of two-way catalysts 18 is configured to receive a portion of exhaust gas flow 8 from H-SCR catalyst 16 through respective conduits 14. Each of two-way catalysts 18 may be housed in a separate housing, such as a metal can, or in a single housing that is adapted to keep the portions of exhaust gas flow 8 associated with each of the two-way catalysts 18 separate from one another. The configuration of system 10 in this embodiment may be advantageous, for example, when providing a second two-way catalyst 18 as a lower cost solution to achieve the necessary through-put of exhaust gas flow 8 rather than increasing the size of a single two-way catalyst 18.

Figure 7:
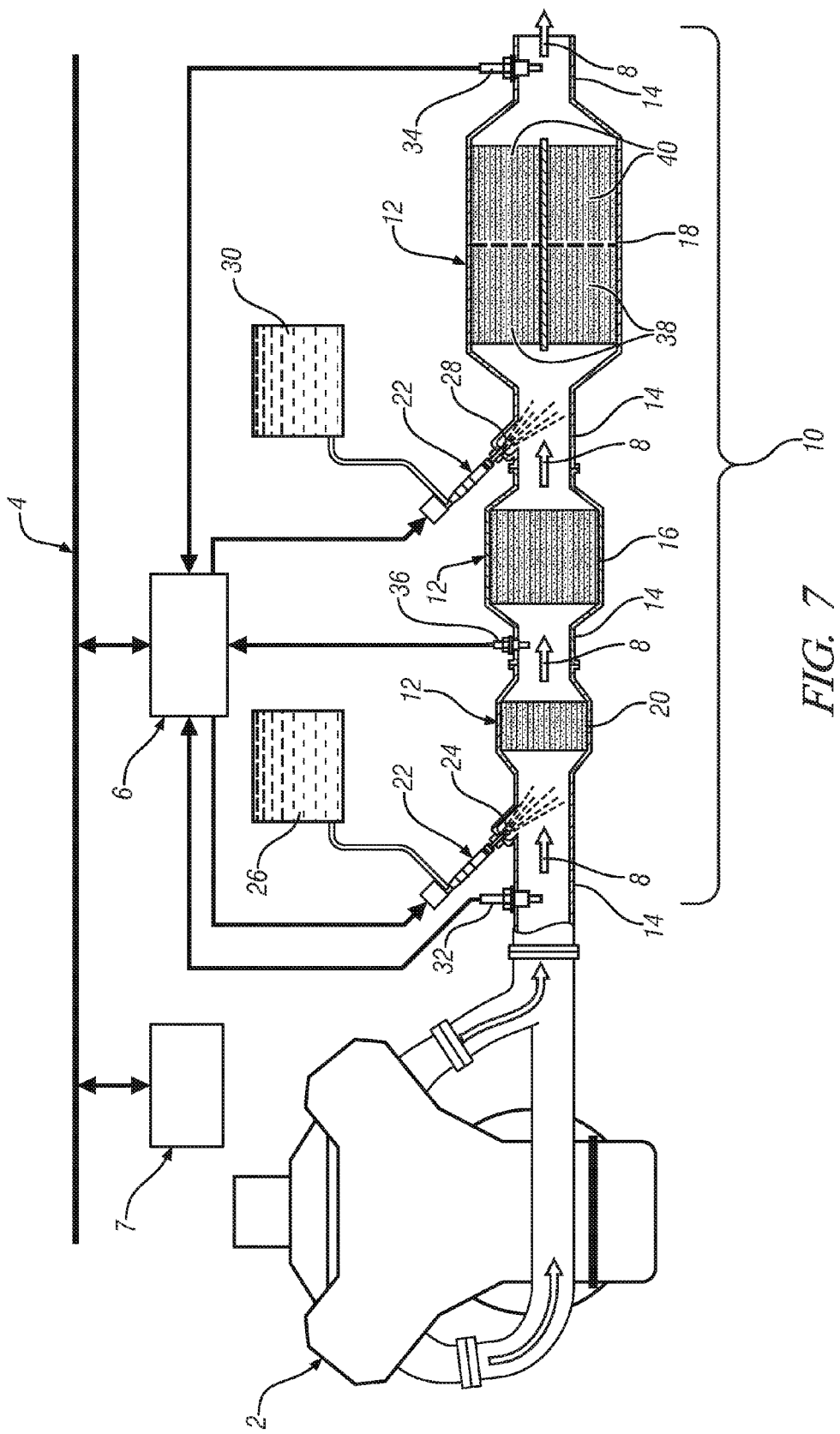
FIG. 7 is a schematic illustration of a seventh exemplary embodiment of an exhaust gas treatment system as disclosed herein.

Referring to FIG. 7, yet another exemplary embodiment of exhaust gas treatment system 10 is illustrated. In this embodiment, a plurality of two-way catalysts 18 is also employed, similar to the embodiment of FIG. 6. In this embodiment, however, the plurality of two-way catalysts 18 are placed in parallel with respect to exhaust gas flow 8 in a single housing, such as a metal can. This configuration is advantageous in that it enables treatment of larger exhaust gas flows 8 than would be possible using a single two-way catalyst 18 while also maintaining packaging of the additional U-SCR catalyst 18 within a single housing. This configuration is also advantageous in that the number of conduits 14 is also reduced on the inlet and outlet sides of the catalysts.

Another advantageous aspect of exhaust gas treatment system 10 is the ability of DOC 20 or HC-SCR catalyst 16, or both of them, to generate heat that is transferred to two-way catalyst 18. Accordingly, the configurations illustrated herein have the ability to heat the exhaust gas flow 8 entering the two-way catalyst 18 to a temperature greater than the temperature of the exhaust gas entering the HC-SCR catalyst 16. The addition of heat to two-way catalyst 18 improves its conversion efficiency. Hence, the placement of the HC-SCR catalyst 16 upstream from the two-way catalyst 18 provides a more efficient configuration of exhaust gas treatment system 10.

The configurations shown in FIGS. 1-7 provide the ability to tune the exhaust gas treatment system 10 to achieve a particular $NO_X$ conversion efficiency. This may be achieved by the use of $NO_X$ sensors, temperature sensors, calibration software, control algorithms and a controller, such as ECM 6 or control system 4, or a combination thereof, together with the periodic and selective use of exhaust gas treatment system 10, including DOC 20, HC-SCR catalyst 16 or two-way catalyst 18, or a combination thereof, to achieve a $NO_X$ conversion efficiency of 90% by volume of the exhaust gas or more. For example, if a nitrogen oxide conversion/reduction (e.g., $NO_X$ to $N_2$) efficiency of about 20% to 50% is desired, the HC-SCR catalyst 16 can be utilized to achieve this efficiency. In another example, if higher $NO_X$ reduction is desired (e.g. about 90% or more), the DOC 20 and HC-SCR 16 can be used to convert/reduce nitrogen oxides from about 20% to about 60% and a urea injector can be utilized to convert/reduce the remainder of the $NO_X$ through the two-way catalyst 18. This higher conversion percentage of $NO_X$, through the use of the two-way catalyst 18, is particularly advantageous over the life of the exhaust gas treatment system 10 to counteract the deteriorating effects of sulfur regenerations on both the HC-SCR catalyst 16 two-way catalyst 18 and the corresponding reductions in their conversion efficiency.

Exhaust gas treatment system 10 and the controller, such as ECM 6, control system 4, or a combination thereof, may be operated in various operational modes. In one exemplary embodiment, the controller is configured to operate in a first mode to minimize consumption of urea or ammonia, or a combination thereof, and minimize $NO_X$ conversion in two-way catalyst 18. In another exemplary embodiment, the controller is configured to operate in a second mode to minimize consumption of a hydrocarbon, CO or $H_2$ material, or combination thereof, and minimize $NO_X$ conversion in HC-SCR catalyst 16. These modes can be implemented to minimize the consumption of the hydrocarbon, CO or $H_2$ material, or to minimize the consumption of urea or ammonia, or a combination thereof In an exemplary embodiment, the exhaust gas treatment system 10 is configured such that the exhaust gas flow 8 from the engine 2 has a first volume fraction of $NO_X$ ($NO_{X1}$) and the exhaust gas flow exiting the two-way catalyst 18 has a second volume fraction of $NO_X$ ($NO_{X2}$), wherein $NO_{X2} \leq 0.1\ NO_{X1}$. In other words, the system is configured for a conversion efficiency of $NO_X$ of at least 90%. In one configuration, using the HC-SCR catalyst 16 and periodic and selective injection of a hydrocarbon, CO or $H_2$ material, or a combination thereof, into the exhaust gas flow 8 upstream of the HC-SCR catalyst 16, the HC-SCR catalyst 16 provides a volume fraction reduction of $NO_{X1}$ expressed as a third volume fraction of $NO_{X1}$ ($NO_{X3}$) in the exhaust gas flow exiting the HC-SCR catalyst 16, where $0.30 NO_{X1} \leq NO_{X3} \leq 0.80 NO_{X1}$, or a $NO_X$ conversion efficiency of about 20% to 70%.

In another configuration, using the two-way catalyst 18 and periodic and selective injection of urea or ammonia, or a combination thereof, into the exhaust gas flow 8 upstream of the two-way catalyst 18, the two-way catalyst 18 provides a volume fraction reduction of $NO_{X1}$ expressed as a fourth volume fraction of $NO_{X1}$ ($NO_{X4}$) in the exhaust gas flow exiting the two-way catalyst 18, where $0.05 NO_{X1} \leq NO_{X4} \leq 0.60 NO_{X1}$.

The exhaust gas treatment system 10 further includes ECM 6 and control system 4 for controlling the function of one or more of the components of the exhaust gas treatment system 10. At a minimum, this may include regeneration of one or more of the components of the exhaust gas treatment system 10. Accordingly, it is contemplated that the controller may be in communication with one or more sensors, such as temperature sensors, particulate matter sensors, oxygen sensors or otherwise, for monitoring the condition of the exhaust gas treatment system 10. Such sensors may be located before, after or both before and after any of the components of the exhaust gas treatment system 10, e.g., DOC 20, HC-SCR catalyst 16, two-way catalyst 18 or otherwise. Further, the controller may be in communication with one or more heat sources suitable for causing regeneration of the components of the exhaust gas treatment system 10.

It is also contemplated that the controller may be used to achieve a specific $NO_X$ reduction/conversion target that is within the reduction/conversion capability limits of the system 10. For example, based on a mandated emission requirement, the emission target, i.e., the $NO_X$ conversion requirement, may be fixed, e.g. 80%. The control system 4, including ECM 6, can determine $NO_{X1}$ using the first $NO_X$ sensor 32 and $NOX_2$ using exhaust gas sensor 34, such as a second $NO_X$ sensor, to determine the current $NO_X$ reduction. If the value of $NO_{X2}$ reflects a sufficient reduction, no action is required. If it does not, control system 4 can be used to periodically inject urea through the urea injector or HC through the HC injector to achieve the target value of $NO_{X2}$. As noted above, the selection of the reductant, urea or HC, can, for example, be based on a tuning or control mode that is adapted to minimize usage of one or the other of these constituents. Control system 4 may also base the selection on required regeneration of one or the other of HC-SCR catalyst 16 or two-way catalyst 18, wherein the selection of one device and its associated reductant is preferred while the other is undergoing regeneration.

The present invention offers the following features and advantages. First, embodiments that include DOC 20 will oxidize NO to $NO_2$ that will enhance the $NO_X$ reduction using the HC-SCR catalyst 16 and two-way catalyst 18 and increase the overall $NO_X$ conversion efficiency of the system. Secondly, the advanced combustion described herein will utilize high HC levels, either as a result of control of the combustion process to produce high engine out HC levels, or as a result of direct injection of a hydrocarbon, CO or $H_2$, or combination thereof, into the exhaust gas flow 8. The high HC levels can be effectively oxidized in HC-SCR 16, and in embodiments that include a DOC 20, in the combination of the DOC 20 and HC-SCR 16, to minimize two-way catalyst 18 hydrocarbon poisoning and tailpipe HC emissions. Thirdly, a tunable $NO_X$ conversion efficiency can be achieved with this system. For example, if about 20% to about 50% $NO_X$ conversion efficiency is desired, the HC-SCR catalyst 16 can be used for $NO_X$ reduction. Fourthly, if a higher (i.e., greater than about 20 to about 50%) $NO_X$ conversion efficiency is desired, the additional capability of the combined DOC 20/HC-SCR catalyst 16 may be used to achieve an additional about 10 to about 15% $NO_X$ reduction, or a total of up to about 20% to about 60%, and any additional $NO_X$ conversion that is needed can be achieved using the two-way catalyst 18 by injection of urea. Fifthly, utilizing this approach, a mode of operation of the exhaust treatment system 10 that seeks to maximize the $NO_X$ conversion of the HC-SCR catalyst 16 (and DOC 20 in embodiments where it is employed) can be used to reduce urea consumption, and more particularly to minimize the consumption of urea and thereby increase urea refill intervals. Sixthly, even when operated as described above using a mode where the HC-SCR catalyst 16 is used for much of the $NO_X$ conversion, or even most of the $NO_X$ conversion, the durability of the HC-SCR catalyst 16 can be improved because the system can periodically and automatically be switched to reduce the reliance on the HC-SCR catalyst 16 by use of the two-way catalyst 18 to balance the $NO_X$ conversion load, so that the HC-SCR catalyst 16 is not used all the time or is not required to operate at its highest $NO_X$ conversion efficiency. Balancing of the $NO_X$ conversion load between the HC-SCR catalyst 16 and the two-way catalyst 18 can also be utilized to reduce the sulfur regeneration cycles required for the HC-SCR catalyst 16. Seventhly, with the two-way catalyst 18 downstream of the HC-SCR catalyst 16, $NO_X$ reduction at low exhaust gas temperatures can be achieved using the HC-SCR catalyst 16, and in embodiments that employ a DOC 20, both the DOC 20 and HC-SCR catalyst 16 can contribute to the NO to $NO_2$ oxidation when the two-way catalyst 18 is providing the primary $NO_X$ reduction. Eighthly, during regeneration of the DPF 38 and oxidation of the entrapped soot, the exhaust temperatures will be too high for effective HC-SCR catalyst 16 operation, but $NO_X$ reduction via urea injection is still possible, thus allowing $NO_X$ control improvements during the DPF 38 regeneration cycle. Ninthly, under high engine speed and load conditions, the high temperature of the exhaust gas flow 8 with associated high levels of $NO_X$ may exceed the capacity of the HC-SCR catalyst 16 (or DOC 20 and HC-SCR catalyst 16) to achieve the desired $NO_X$ conversion efficiency. Under such conditions, high $NO_X$ conversion efficiency and control using the two-way catalyst 18 and urea injection will still be possible.

In accordance with the exemplary embodiments, an exhaust treatment system for reducing $NO_X$ emissions is disclosed that utilizes the understanding of existing technologies for $NO_X$ reduction for development of synergistic combinations that provide enhanced $NO_X$ reduction and control versus either of the technologies when used individually. HC-SCR catalysts alone tend to have narrow operating temperature ranges, being useful for $NO_X$ conversion at relatively low operating temperatures of exhaust gas treatment system 10, while two-way catalysts that include a U-SCR are useful at relatively higher exhaust system operating temperatures, but tend to be susceptible to HC poisoning. For example, lean $NO_X$ technology based on HC-SCR catalysts 16 include various catalyst formulations and catalyst/substrate combinations. Platinum catalyst on alumina substrate ($Pt/Al_2O_3$) HC-SCR catalysts work at low temperatures (around 200° C.) and have high peak conversion, but a very narrow temperature window of operation, so by itself this HC-SCR formulation is not very useful. Another disadvantage associated with Pt catalysts has been their $SO_2$ oxidation activity, but they may be used successfully with low sulfur fuels; however, the Pt catalyst is also susceptible to deactivation by sulfur contamination. Other HC-SCR catalysts 16 include various Cu-Zeolite or Ag-Zeolite catalyst/substrate combinations. These HC-SCR catalysts 16 tend to work at higher temperatures but do not have good low temperature performance. As another example, two-way catalysts that include a diesel particulate filter (DPF) and urea selective catalyst reduction (two-way) catalyst (DPF+U-SCR) do both $NO_X$ and particulate matter (PM) reduction as the U-SCR has a Cu/Fe Zeolite (SCR) washcoat on a wall flow filter. With urea injection, two-way catalysts can achieve high $NO_X$ reduction while also providing particulate matter reduction. However, the U-SCR washcoat tends to lose efficiency if there is too much hydrocarbon (HC) in the exhaust. If a catalyst combination of a lean $NO_X$ catalyst 16 (HC-SCR) and two-way catalyst 18 is utilized, with the lean $NO_X$ catalyst 16 upstream of the two-way catalyst 18, and the urea injector for the two-way catalyst 18 downstream of the lean $NO_X$ catalyst 16; however, many of the shortcomings described above would be overcome. For example, the lean $NO_X$ catalyst 16 will advantageously oxidize the NO to $NO_2$ that will help with the $NO_X$ reduction using the two-way catalyst 18. Further, certain advanced combustion processes will have high engine out HC levels. The high HC levels can be effectively utilized with this combination of HC-SCR 16 and two-way catalysts 18 to reduce $NO_X$ over the lean $NO_X$ catalyst while oxidizing the remainder of the HC to release thermal energy. Another advantage is that tunable $NO_X$ conversion efficiency can be achieved with this system. If only about 20 to about 50% $NO_X$ reduction is needed in certain engine operating regimes, or in configurations that also include DOC 20 about 20% to about 60% $NO_X$ reduction, the HC-SCR catalyst 16 can be used without injection of urea for the two-way catalyst 18, but if higher efficiency is desired, the two-way catalyst 18 can be made active by initiating urea injection. Utilizing this approach can reduce urea consumption and increase urea refill intervals. As a further advantage, there is potential to reduce the exhaust system cost in terms of precious metal loading and total packaging space by using the lean $NO_X$ catalyst 16 as the $NO_X$ reduction, NO oxidation and HC reduction device and the two-way catalyst 18 for PM and additional $NO_X$ reduction. As yet a further advantage, both an active (using HC dosing) and passive lean $NO_X$ treatment approach may be used based on $NO_X$ conversion efficiency requirements and engine out HC levels. During normal operation, if engine out HC is high and $NO_X$ reduction demand is low, no active control is required. This system will do the required $NO_X$ reduction. If $NO_X$ reduction demand increases, in-cylinder HC injection or injection through a separate dosing device, such as a fuel injection, can be initiated to increase the carbon to $NO_X$ (C/N) ratio to increase lean $NO_X$ reduction efficiency. If even further $NO_X$ reduction is desired, urea injection can be initiated to convert $NO_X$ to $N_2$ in the two-way catalyst 18. In this way, a wide range of $NO_X$ conversion efficiencies can be achieved which would not be possible with either one of these technologies individually. Also, urea consumption can be reduced as urea injection is not required all of the time. As yet another advantage, there is potential to reduce the exhaust treatment system cost in embodiments that do not require an HC injector or a separate diesel oxidation catalyst (DOC).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas treatment system for a diesel engine, comprising:
    a diesel oxidation catalyst in fluid communication with a diesel engine to receive an exhaust gas flow therefrom;
    a hydrocarbon selective catalytic reduction catalyst (HC-SCR) in direct fluid communication with the diesel oxidation catalyst through a first conduit that extends directly from the diesel oxidation catalyst to the HC-SCR to receive the exhaust gas flow therefrom;
    a two-way catalyst in direct fluid communication with the HC-SCR through a second conduit that extends directly from the HC-SCR to the two-way catalyst to receive the exhaust gas flow therefrom, the two-way catalyst comprising a urea selective catalytic reduction (two-way) catalyst and a diesel particulate filter (DPF);
    a first injection device that is configured to inject a hydrocarbon, CO or $H_2$ material, or a combination thereof, into the exhaust gas flow between the engine and the diesel oxidation catalyst, wherein the diesel oxidation catalyst, HC-SCR and two-way catalyst are the only catalyst devices used in the exhaust gas treatment system;
    a second injection device that is configured to inject urea or ammonia, or a combination thereof, into the exhaust gas flow between the HC-SCR and the two-way catalyst; and a controller configured to periodically reduce the reliance on the HC-SCR by the use of the two-way catalyst to balance NOx conversion load of the exhaust gas treatment system.

2. The exhaust gas treatment system of claim 1, wherein the HC-SCR catalyst comprises a ceramic flow-through monolith and the two-way catalyst comprises a ceramic wall-flow monolith.

3. The exhaust gas treatment system of claim 2, wherein the HC-SCR catalyst comprises a first washcoat disposed on the ceramic flow-through monolith, the first washcoat comprising platinum disposed on a ceramic matrix or Cu or Ag, or a combination thereof, disposed on a zeolite matrix and the U-SCR catalyst comprises a second washcoat disposed on the ceramic wall-flow monolith, the second washcoat comprising copper or iron, or a combination thereof, disposed on a zeolite matrix.

4. The exhaust gas treatment system of claim 2, wherein the two-way catalyst comprises a washcoat disposed on the ceramic wall-flow monolith, the washcoat comprising vanadia.

5. The exhaust gas treatment system of claim 2, wherein the two-way catalyst comprises a first two-way catalyst and a second two-way catalyst, the second two-way catalyst comprising a washcoat disposed on a second ceramic or metal flow-through monolith.

6. The exhaust gas treatment system of claim 5, wherein the second flow-through monolith is disposed to receive the exhaust gas flow prior to or after the wall-flow monolith.

7. The exhaust gas treatment system of claim 1, wherein the two-way catalyst comprises a plurality of ceramic wall-flow monoliths.

8. The exhaust gas treatment system of claim 1, wherein the exhaust gas flow from the engine has a first volume fraction of $NO_x$ ($NO_{x1}$) and the exhaust gas flow exiting the two-way catalyst has a second volume fraction of $NO_x$ ($NO_{x2}$), and wherein $NO_{2x} \le 0.1\ NO_{x1}$.

9. A method of using an exhaust treatment system comprising a diesel oxidation catalyst in fluid communication with a diesel engine to receive an exhaust gas flow therefrom; a hydrocarbon selective catalytic reduction catalyst (HC-SCR) in direct fluid communication with the diesel oxidation catalyst through a first conduit that extends directly from the diesel oxidation catalyst to the HC-SCR to receive an exhaust gas flow therefrom; a two-way catalyst in direct fluid communication with the HC-SCR through a second conduit that extends directly from the HC-SCR to the two-way catalyst to receive the exhaust gas flow therefrom; a first injection device that is configured to periodically and selectively inject a hydrocarbon, CO or $H_2$ material, or combination thereof, into the exhaust gas flow between the diesel oxidation catalyst and the engine; a second injection device that is configured to periodically and selectively inject urea or ammonia, or a combination thereof, into the exhaust gas flow between the HC-SCR and the two-way catalyst; and a controller that is configured to control operation of the engine and periodic and selective injection of the hydrocarbon, CO or $H_2$ material, or combination thereof, and periodic and selective injection of the urea or ammonia, or combination thereof, and determine an amount of $NO_x$ in the exhaust gas flow, wherein the diesel oxidation catalyst, HC-SCR and two-way catalyst are the only catalyst devices used in the exhaust gas treatment system; comprising:
 operating the engine to produce the exhaust gas flow;
 periodically and selectively injecting the hydrocarbon, CO or $H_2$ material, or a combination thereof, and the urea or ammonia, or a combination thereof, into the exhaust gas flow using the controller, wherein the exhaust gas flow from the engine has a first volume fraction of $NO_x$ ($NO_{x1}$) and the exhaust gas flow exiting the two-way catalyst has a predetermined second volume fraction of $NO_x$ ($NO_{x2}$); and
 periodically reducing using the controller, the reliance on the HC-SCR by using the two-way catalyst to balance an NOx conversion load of the exhaust treatment system.

10. The method of claim 9, wherein periodically and selectively injecting comprises injecting the hydrocarbon, CO or $H_2$ material, or combination thereof, into the exhaust gas flow.

11. The method of claim 10, wherein the HC-SCR provides a volume fraction reduction of $NO_{x1}$ expressed as a third volume fraction of $NO_{x1}$ ($NO_{x3}$) in the exhaust gas flow exiting the HC-SCR catalyst, wherein $0.50\ NO_{x1} \le NO_{x3} \le 0.80\ NO_{x1}$.

12. The method of claim 11, wherein the controller is configured to operate in a first mode to minimize consumption of urea or ammonia, or a combination thereof, and minimize $NO_3$.

13. The method of claim 9, wherein periodically and selectively injecting comprises injecting the urea or ammonia, or a combination thereof, into the exhaust gas flow.

14. The method of claim 13, wherein the two-way catalyst provides a volume fraction reduction of $NO_{x1}$ expressed as a fourth volume fraction of $NO_{x1}$ ($NO_{x4}$), wherein $0.05\ NO_{x1} \le NO_{x4} \le 0.60\ NO_{x1}$.

15. The method of claim 14, wherein the controller is configured to operate in a second mode to minimize consumption of hydrocarbon, CO or $H_2$ material, or combination thereof, and minimize $NO_{x4}$.

16. The method of claim 9, wherein the controller is configured to control the exhaust gas flow from the engine, the first injection device or the second injection device, or a combination thereof, to produce a predetermined second volume fraction of $NO_{x2} \le 0.10\ NO_{x1}$.

17. A diesel engine and exhaust gas treatment system, comprising:
 a diesel engine;
 a diesel oxidation catalyst in fluid communication with the diesel engine to receive an exhaust gas flow therefrom;
 a hydrocarbon selective catalytic reduction catalyst (HC-SCR) in direct fluid communication with the diesel oxidation catalyst through a first conduit that extends directly from the diesel oxidation catalyst to the HC-SCR to receive the exhaust gas flow therefrom;
 a two-way catalyst in direct fluid communication with the HC-SCR through a second conduit that extends directly from the HC-SCR to the two-way catalyst to receive the exhaust gas flow therefrom, the two-way catalyst comprising a urea selective catalytic reduction (two-way) catalyst and a diesel particulate filter (DPF);
 a first injection device that is configured to inject a hydrocarbon, CO or $H_2$ material, or a combination thereof, into the exhaust gas flow between the engine and the diesel oxidation catalyst, wherein the diesel oxidation catalyst, HC-SCR and two-way catalyst are the only catalyst devices used in the exhaust gas treatment system;
 a second injection device that is configured to inject urea or ammonia, or a combination thereof, into the exhaust gas flow between the HC-SCR and the two-way catalyst; and
 a controller configured to periodically reduce the reliance on the HC-SCR by the use of the two-way catalyst to balance an NOx conversion load of the exhaust gas treatment system.

18. The system of claim 17, further comprising a second two-way catalyst in direct fluid communication with the HC-SCR through the second conduit to receive the exhaust gas flow therefrom, the second two-way catalyst comprising a second urea selective catalytic reduction (two-way) catalyst and a second diesel particulate filter (DPF).

19. The system of claim 18, wherein the second conduit forms a split exhaust path, wherein the two-way catalyst and the second two-way catalyst are arranged in parallel in the split exhaust path.

20. The system of claim 17, further comprising a first NOx sensor arranged between the diesel engine and the diesel oxidation catalyst, a temperature sensor arranged in the first conduit between the diesel oxidation catalyst and the HC-SCR, and a second NOx sensor arranged downstream of the two-way catalyst.

\* \* \* \* \*